(12) United States Patent
Suzuki

(10) Patent No.: US 10,574,923 B2
(45) Date of Patent: Feb. 25, 2020

(54) IMAGE CAPTURING DEVICE AND DRIVING METHOD THEREOF

(71) Applicant: CANON KABUSHIKI KAISHA, Tokyo (JP)

(72) Inventor: Tatsuya Suzuki, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 16/012,910

(22) Filed: Jun. 20, 2018

(65) Prior Publication Data

US 2018/0376092 A1 Dec. 27, 2018

(30) Foreign Application Priority Data

Jun. 27, 2017 (JP) ................................. 2017-125591

(51) Int. Cl.
*H04N 5/378* (2011.01)
*H04N 5/363* (2011.01)

(52) U.S. Cl.
CPC ............. *H04N 5/378* (2013.01); *H04N 5/363* (2013.01)

(58) Field of Classification Search
CPC ........ H04N 5/378; H04N 5/363; H04N 5/357; H04N 5/3698
USPC ....................................... 348/241; 250/208.1
See application file for complete search history.

(56) References Cited

U.S. PATENT DOCUMENTS

| 8,817,143 B2 * | 8/2014 | Murata ................ H04N 5/3745 348/241 |
| 9,967,497 B2 | 5/2018 | Kobayashi et al. |
| 2012/0188422 A1 * | 7/2012 | Cho ...................... H04N 5/2258 348/280 |
| 2012/0205520 A1 * | 8/2012 | Hsieh ................ H01L 27/14605 250/208.1 |
| 2014/0091202 A1 * | 4/2014 | Kobayashi ............. H04N 5/378 250/208.1 |

FOREIGN PATENT DOCUMENTS

JP 2014-075620 A 4/2014

* cited by examiner

*Primary Examiner* — Sinh Tran
*Assistant Examiner* — Zhenzhen Wu
(74) *Attorney, Agent, or Firm* — Venable LLP

(57) ABSTRACT

An image capturing device including a pixel array having pixels forming a first group and pixels forming a second group, a selection circuit to sequentially output signals of the pixels of the first group to a first signal line and sequentially output signals of the pixels of the second group to a second signal line, an output circuit to output a pixel signal in accordance with a signal supplied to an input node from the pixel array via the selection circuit, a switch circuit to control connection of the first signal line to the input node and connection of the second signal line to the input node, a load circuit to consume power, a reset circuit to perform a reset operation of resetting a potential of the input node.

15 Claims, 7 Drawing Sheets

IMAGE CAPTURING DEVICE AND DRIVING METHOD THEREOF

BACKGROUND OF THE INVENTION

Field of the Invention

The present invention relates to an image capturing device and a driving method thereof.

Description of the Related Art

Japanese Patent Laid-Open No. 2014-75620 discloses a technique for suppressing a variation in an output signal caused by the potential of a current supply line varying due to an increase in a consumed current amount that occurs in the transition from a blanking period to an output period (scanning period). In this technique, the consumed current amount in the blanking period and the consumed current amount in the output period are made equal by arranging a current consumption circuit and causing the current consumption circuit to consume the current in the blanking period. According to this technique, the potential variation of the current supply line (power supply line) is suppressed, and thus the variation in the output signal is suppressed.

The signal of each pixel is supplied, via a switch, to a common signal line which is reset to a reference potential, supplied to an amplifier via the common signal line, amplified by the amplifier, and output as a pixel signal. In the output period (scanning period), a scanning circuit selects the signal of a pixel whose signal is to be supplied to the amplifier by sequentially selecting a plurality of switches that correspond to the plurality of pixels. Hence, a number of switches corresponding to the number of pixels are connected to the common signal line. As a result, when the number of pixels is increased, the number of switches to be connected to the common signal line is also increased, and this increases the parasitic capacitance of the common signal line. The increase in the parasitic capacitance can minimize the potential variation of the common signal line that occurs when the signal of a pixel is supplied to the common signal line that has been reset to the reference potential. This causes the S/N ratio to decrease. Thus, as a method to reduce the parasitic capacitance of each signal line, a method of dividing the common signal line into a plurality of signal lines which include a first signal line and a second signal line can be considered.

However, in this case, unless the divided first and second signal lines (plurality of signal lines) are not reset to the same reference potential, the reference potential can change when switching from the first signal line to the second signal line. This can cause a step (offset) between the pixel signal output via the first signal line and the pixel signal output via the second signal line when switching from the first signal line and the second signal line. Although it is possible to reset the plurality of signal lines to the same potential if the potential of the power supply line is constant, it is difficult to set the consumed current amount to a predetermined amount even if a current consumption circuit is arranged. In addition, in a period immediately after the completion of the blanking period (a period in which the current is consumed by the current consumption circuit), the potential variation of the power supply line is larger in a case in which the current consumption circuit is arranged than that in a case in which the current consumption circuit is not arranged.

SUMMARY OF THE INVENTION

The present invention provides a technique advantageous in reducing a step between pixel signals while suppressing a decrease in an S/N ratio.

One of aspects of the present invention provides an image capturing device comprising: a pixel array that includes a plurality of pixels forming a first pixel group and a plurality of pixels forming a second pixel group; a selection circuit configured to sequentially output signals of the plurality of pixels of the first pixel group to a first signal line and sequentially output signals of the plurality of pixels of the second pixel group to a second signal line; an output circuit having an input node and configured to output a pixel signal in accordance with a signal supplied to the input node from the pixel array via the selection circuit; a switch circuit configured to control a connection of the first signal line to the input node and a connection of the second signal line to the input node; a load circuit configured to consume power; and a reset circuit configured to perform a reset operation of resetting a potential of the input node, wherein the load circuit consumes a first power in a first period in which at least a part of a photoelectric conversion period of the pixel array is included and the output circuit does not output the pixel signal, and the load circuit consumes a second power which is smaller than the first power in a second period different from the first period, the second period includes a preparation period, a first readout period which is after the preparation period and in which a signal is read out from the first pixel group, and a second readout period which is after the first readout period and in which a signal is read out from the second pixel group, the first signal line and the second signal line are reset, in the preparation period, by the reset circuit performing the reset operation in a state in which the first signal line and the second signal line are connected to the input node by the switch circuit, pixel signals corresponding to the signals of the plurality of pixels of the first pixel group are sequentially output, in the first readout period, by the output circuit in a state in which the first signal line is connected to the input node and the second signal line is disconnected from the input node by the switch circuit, and pixel signals corresponding to the signals of the plurality of pixels of the second pixel group are sequentially output, in the second readout period, by the output circuit in a state in which the first signal line is disconnected from the input node and the second signal line is connected to the input node by the switch circuit.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
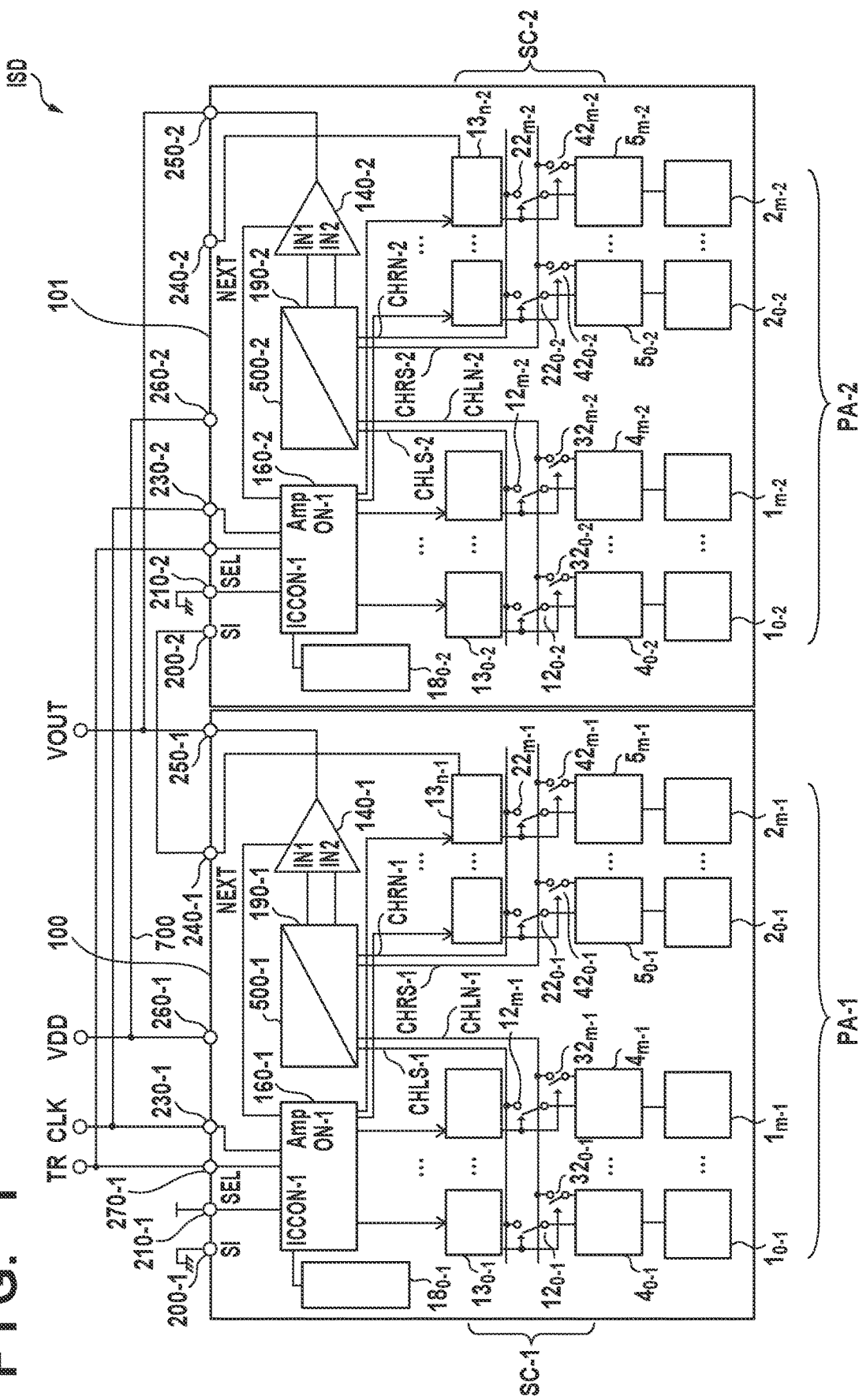
FIG. 1 is a view showing the arrangement of an image capturing device according to an embodiment of the present invention.

FIG. 1 shows the arrangement of an image capturing device ISD according to an embodiment of the present invention. Although the image capturing device ISD can be formed from a plurality of chips 100 and 101, it may be formed from a single chip. In the chips 100 and 101, although the same reference numerals denote components that have the same arrangement, "-1" has been added as a branch number to the reference numeral of each component of the chip 100, and "-2" has been added as a branch number to the reference numeral of each component of the chip 101. In a case in which discrimination between the chips 100 and 101 is unnecessary, an explanation will be given without the branch number.

The chips 100 and 101 each include pads 200, 210, 230, 240, 250, 260, and 270. Each pad 200 is a terminal (corresponding signal name or terminal name=SI) for inputting scanning data to shift registers $13_0$ to $13_n$. Each pad 210 is a terminal (corresponding signal name or terminal name=SEL) for inputting a signal for selecting a chip. Each pad 230 is a terminal (corresponding signal name or terminal name=CLK) for inputting a clock signal. Each pad 240 is a terminal (corresponding signal name or terminal name=NEXT) for outputting END signals of the respective shift registers $13_0$ to $13_n$. Each pad 250 is a terminal (corresponding signal name or terminal name=VOUT) for outputting each pixel signal. Each pad 260 is a terminal for inputting a power supply voltage VDD. Each pad 270 is a terminal (corresponding signal or terminal name=TR) for inputting a start signal related to each chip operation.

Aground voltage is applied to a pad 200-1 of the chip 100, and a signal output from a pad 240-1 of the chip 100 is supplied to a pad 200-2 of the chip 101. A power supply voltage is supplied to a pad 210-1 of the chip 100, and the ground voltage is supplied to a pad 210-2 of the chip 101. The power supply voltage VDD is supplied to the chips 100 and 101 via a power supply line 700. Hence, the power supply voltage VDD is supplied commonly to the chips 100 and 101.

The chips 100 and 101 each include a pixel array PA. Each pixel array PA includes a first pixel group and a second pixel group as a plurality of pixel groups, each of which is formed by a plurality of pixels. The first pixel group is formed by a plurality of pixels $1_0$ to $1_m$. The second pixel group is formed by a plurality of pixels $2_0$ to $2_m$. In this example, the pixel array PA includes a plurality of pixels which are arranged so as to form a line sensor. However, the pixel array PA may include a plurality of pixels which are arranged so as to form a plurality of rows and a plurality of columns.

The chips 100 and 101 each include a plurality of holding portions $4_0$ to $4_m$ corresponding to the plurality of pixels $1_0$ to $1_m$ of the first pixel group and a plurality of holding portions $5_0$ to $5_m$ corresponding to the plurality of pixels $2_0$ to $2_m$ of the second pixel group. In this example, each of the plurality of holding portions $4_0$ to $4_m$ and $5_0$ to $5_m$ holds an optical signal (S signal), which is generated by photoelectric conversion in a pixel in accordance with incident light, and a noise signal (N signal), which is generated in the pixel.

The chips 100 and 101 each include a selection circuit SC. Each selection circuit SC sequentially outputs signals from the plurality of pixels $1_0$ to $1_m$ of the first pixel group to first signal lines CHLS and CHLN, and sequentially outputs signals from the plurality of pixels $2_0$ to $2_m$ of the second pixel group to second signal lines CHRS and CHRN. Each first signal line CHLS and each second signal line CHRS are common signal lines for transmitting optical signals. Each first signal line CHLN and each second signal line CHRN are common signal lines for transmitting noise signals. Each selection circuit SC includes the shift registers $13_0$ to $13_n$ and selection switches $12_0$ to $12_m$, $32_0$ to $32_m$, $22_0$ to $22_m$, and $42_0$ to $42_m$.

The shift registers $13_0$ to $13_n$ controls the selection switches $12_0$ to $12_m$, $32_0$ to $32_m$, $22_0$ to $22_m$, and $42_0$ to $42_m$ so as to sequentially select a pixel among the plurality of pixels $1_0$ to $1_m$ of the first pixel group and the plurality of pixels $2_0$ to $2_m$ of the second pixel group. More specifically, in a first readout period in which a signal is read out from the plurality of pixels $1_0$ to $1_m$ of the first pixel group, the shift registers $13_0$ to $13_n$ control the selection switches $12_0$ to $12_m$ and $32_0$ to $32_m$ so that a pixel of the plurality of pixels $1_0$ to $1_m$ is sequentially selected. Also, in a second readout period in which a signal is read out from the plurality of pixels $2_0$ to $2_m$ of the second pixel group, the shift registers $13_0$ to $13_n$ control the selection switches $22_0$ to $22_m$ and $42_0$ to $42_m$ so that a pixel of the plurality of pixels $2_0$ to $2_m$ is sequentially selected.

Each of the chips 100 and 101 can further include an output circuit (output amplifier) 140, a control circuit 160, a load circuit 180, a switch circuit 190, and a reset circuit 500. Each control circuit 160 generates a control signal that controls the output circuit 140, the load circuit 180, and the switch circuit 190. The output circuit 140 includes input terminals IN1 and IN2 and outputs, to the pad 250 (VOUT), a pixel signal corresponding to each signal supplied to the input terminals IN1 and IN2 from the pixel array PA via the selection circuit SC. The output circuit 140 is set in an active state when a control signal AmpON controlled by the control circuit 160 is set at high level, and is set in an inactive state when the control signal AmpON is set at low level. The switch circuit 190 includes input nodes N1 and N2 (to be described later) for controlling the potential of the input terminals IN1 and IN2, respectively, of the output circuit 140 and controls the connection of the first signal lines CHLS and CHLN and the connection of the second signal lines CHRS and CHRN to the input nodes N1 and N2. Note that in this specification, although it has been arranged so that the high level is the active level and the low level is the inactive level for all components, this arrangement may be reversed for all or some of the components.

The power supply voltage VDD is supplied to each load circuit 180 via the power supply line 700. The load circuit 180 is a circuit that consumes power. The load circuit 180 can be controlled by the control circuit 160 to be in one of a plurality of states that include a first state and a second state. The load circuit 180 consumes a first power in the first state and a second power smaller than the first power in the second state.

In a first period, the load circuit 180 is set to the first state by the control circuit 160 and consumes the first power. The first period includes at least a part of a photoelectric conversion period in the plurality of pixels of the first pixel group and the plurality of pixels in the second pixel group and can be a period in which the output circuit 140 does not output a pixel signal. Alternatively, the first period can be defined as a period in which the output circuit 140 is set in an inactive state.

In a second period different from the first period, the load circuit 180 is set to the second state by the control circuit 160 and consumes the second power which is smaller than the first power. When a period in which the output circuit 140 is in the inactive state is defined as the first period, the second period can be defined as a period in which the output circuit 140 is set to the active state. In this example, the load circuit 180 is set to the first state when a control signal ICCON controlled by the control circuit 160 is at high level and is set to the second state when the control signal ICCON is at low level.

Each reset circuit 500 is controlled by a control signal CHRES (see FIG. 3A) controlled by the control circuit 160. The reset circuit 500 performs a reset operation in which the potential of the input terminals IN1 and IN2 of the output circuit 140 (and the input nodes N1 and N2 controlling the potential of the respective input terminals IN1 and IN2) is reset to a reference potential VREF1. In this reset operation, at least one of the first signal line CHLS and the second signal line CHRS is reset to the reference potential VREF1, and at least one of the first signal line CHLN and the second signal line CHRN is reset to the reference potential VREF1.

Figure 2:
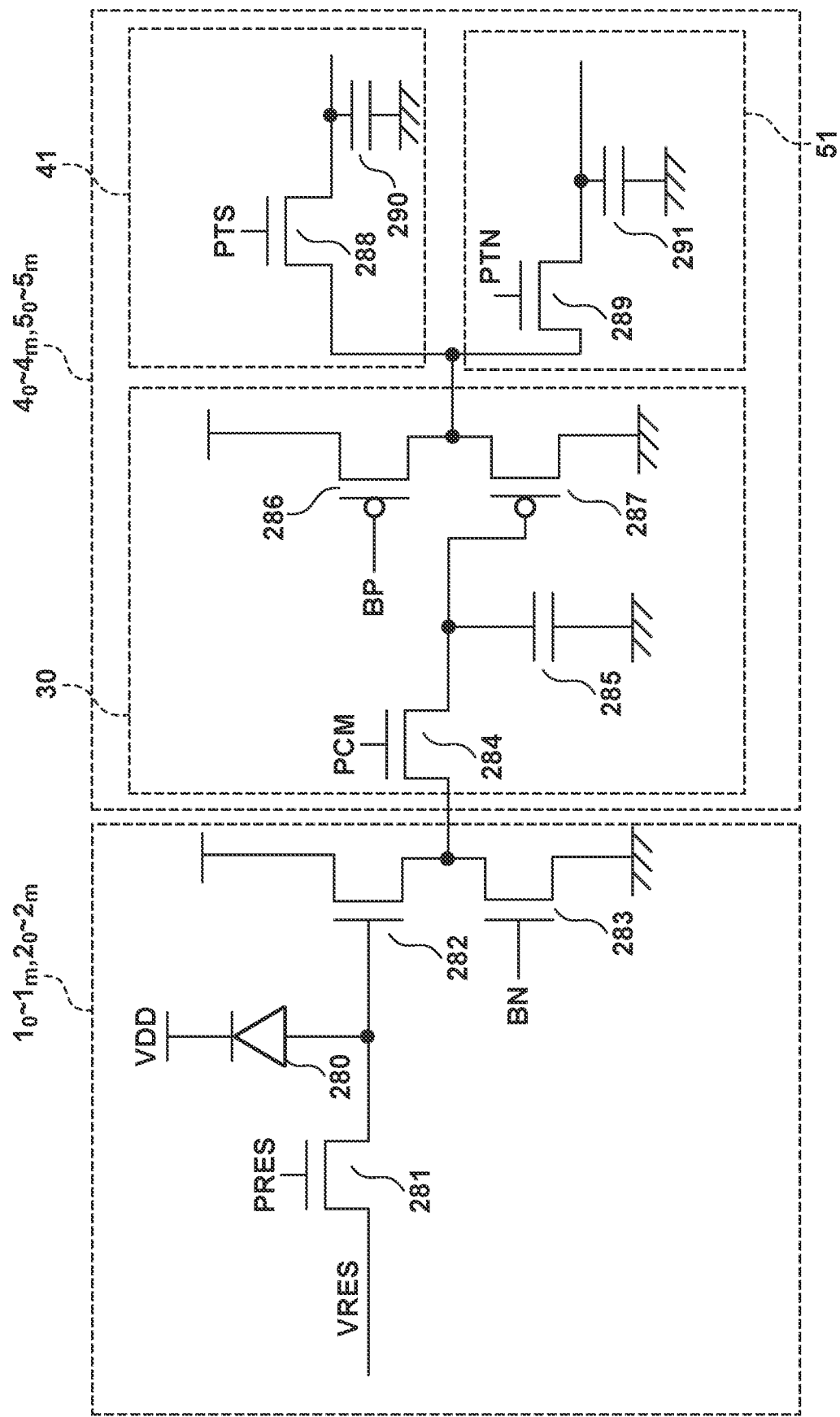
FIG. 2 is a view showing an example of the detailed arrangement of a portion of an image capturing device according to the embodiment of the present invention.

FIG. 2 shows an example of the arrangement of the pixels $1_0$ to $1_m$ and $2_0$ to $2_m$ and the holding portions $4_0$ to $4_m$ and $5_0$ to $5_m$. Note that the pixels and the holding portions are not limited to the arrangement shown in FIG. 2, and various kinds of arrangements can be adopted. Each of the pixels $1_0$ to $1_m$ and $2_0$ to $2_m$ can include a photoelectric converter 280 and MOS transistors 281, 282, and 283. The MOS transistor 281 is a reset transistor that resets the anode of the photoelectric converter 280 and is controlled by a reset signal PRES which is controlled by the control circuit 160. The MOS transistor 282 is an amplification transistor whose gate is connected to the anode of the photoelectric converter 280. The MOS transistor 283 operates as a current source controlled by a bias signal BN, which is controlled by the control circuit 160, and forms a source follower circuit together with the MOS transistor 282.

Each of the holding portions $4_0$ to $4_m$ and $5_0$ to $5_m$ includes MOS transistors 284, 286, 287, 288, and 289 and capacitive elements 285, 290, and 291. Each of the holding portions $4_0$ to $4_m$ and $5_0$ to $5_m$ is controlled by a bias signal BP and control signals PTS, PTN, and PCM controlled by the control circuit 160. The MOS transistor 286 operates as a current source by being controlled by the bias signal BP and forms a source follower circuit together with the MOS transistor 287.

At the start of a blanking period, the capacitive element 285 holds the noise signal and the anode of the photoelectric converter 280 holds the optical signal. Subsequently, the noise signal is written in the capacitive element 291 via the MOS transistor 289 when the control signal PTN is driven to high level. The optical signal is written in the capacitive element 290 via the MOS transistor 288 when the control signals PCM and PTS are driven to high level. The MOS transistors 284, 286, and 287 and the capacitive element 285 form a temporary signal holding portion 30. The MOS transistor 288 and the capacitive element 290 form an optical signal holding portion 41. The MOS transistor 289 and the capacitive element 291 form a noise signal holding portion 51.

Figure 3A:
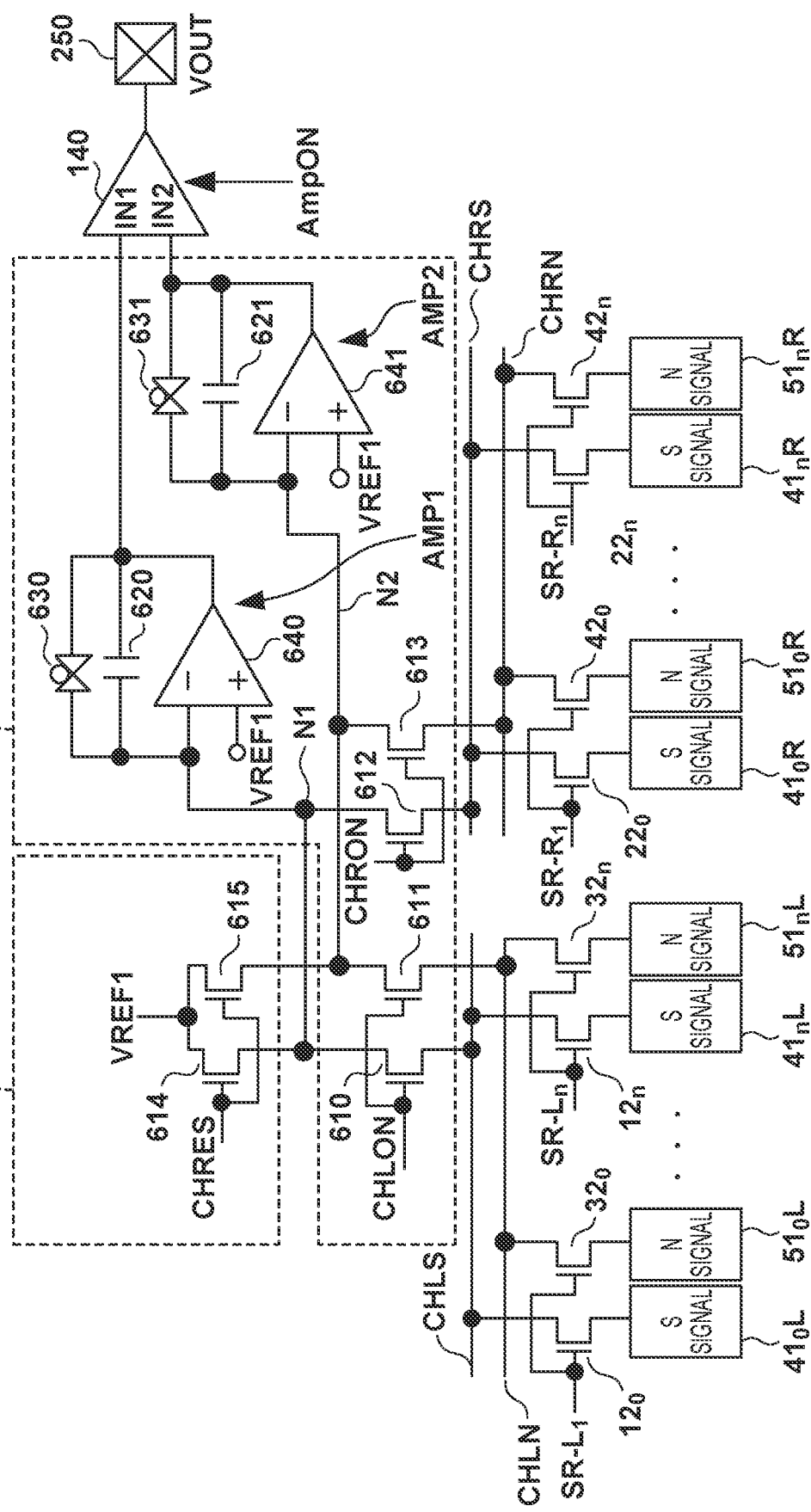
FIGS. 3A and 3B are views each showing an example of the detailed arrangement of a part of the image capturing device according to the embodiment of the present invention.

FIG. 3A shows a detailed arrangement of the switch circuit 190 and the reset circuit 500 and an arrangement related to these components. Note that in FIG. 2, the optical signal holding portions 41 are indicated as optical signal holding portions $41_0L$ to $41_nL$ and $41_0R$ to $41_nR$. The optical signal holding portions $41_0L$ to $41_nL$ are components of the holding portions $4_0$ to $4_m$ corresponding to the pixels $1_0$ to $1_m$ of the first pixel group, and the optical signal holding portions $41_0R$ to $41_nR$ are components of the holding portions $5_0$ to $5_m$ corresponding to the pixels $2_0$ to $2_m$ of the second pixel group. Noise signal holding portions $51_0L$ to $51_nL$ are components of the holding portions $4_0$ to $4_m$ corresponding to the pixels $1_0$ to $1_m$ of the first pixel group, and noise signal holding portions $51_0R$ to $51_nR$ are components of the holding portions $5_0$ to $5_m$ corresponding to the pixels $2_0$ to $2_m$ of the second pixel group.

The switch circuit 190 can include switches 610, 611, 612, 613, 630, and 631, capacitive elements 620 and 621, and differential amplifiers 640 and 641. The switch circuit 190 can be controlled by control signals CHLON and CHRON controlled by the control circuit 160. The reference potential VREF1 generated from the power supply voltage VDD can be provided to the switch circuit 190. The reference potential VREF1 can be generated by, for example, a circuit such as that shown in FIG. 3B. The switches 610, 611, 612, 613, 630, and 631 can be formed by MOS transistors.

The shift registers $13_0$ to $13_n$ of the selection circuit SC sequentially activate selection signals SR-$L_1$ to SR-$L_n$. This causes the holding portions $4_0$ to $4_m$ (the optical signal holding portions $41_0L$ to $41_nL$ and the noise signal holding portions $51_0L$ to $51_nL$ in FIG. 3A) corresponding to the plurality of pixels $1_0$ to $1_m$ of the first pixel group to be sequentially selected. As a result, the optical signal and the noise signal from each of the plurality of pixels $1_0$ to $1_m$ of the first pixel group are sequentially output to the first signal lines CHLS and CHLN. Here, the selection signals SR-$L_1$ to SR-$L_n$ are supplied to the selection switches $12_0$ to $12_n$, respectively, and are supplied to the switches $32_0$ to $32_n$, respectively.

The shift registers $13_0$ to $13_n$ of the selection circuit SC sequentially activate selection signals SR-$R_1$ to SR-$R_n$. This causes the holding portions $5_0$ to $5_m$ (the optical signal holding portions $41_0R$ to $41_nR$ and the noise signal holding portions $51_0R$ to $51_nR$ in FIG. 3A) corresponding to the plurality of pixels $2_0$ to $2_m$ of the second pixel group to be sequentially selected. As a result, the optical signal and the noise signal from each of the plurality of pixels $2_0$ to $2_m$ of the second pixel group are sequentially output to the second signal lines CHRS and CHRN. Here, the selection signals SR-$R_1$ to SR-$R_n$ are supplied to the selection switches $22_0$ to $22_n$, respectively, and are supplied to the switches $42_0$ to $42_n$, respectively.

The switch circuit 190 includes the input nodes N1 and N2 for controlling the potential of the input terminals IN1 and IN2, respectively, of the output circuit 140. The switch circuit 190 includes the switches 610 and 611 that control the connection of the first signal lines CHLS and CHLN to the input nodes N1 and N2 and the switches 612 and 613 that control the connection of the second signal lines CHRS and CHRN to the input nodes N1 and N2. The switches 610 and 612 control the first signal line CHLS and the second signal line CHRS, respectively, to the input node N1. The switches 611 and 613 control the first signal line CHLN and the second signal line CHRN, respectively, to the input node N2. The switches 610 and 611 are controlled by the control signal CHLON controlled by the control circuit 160. The switches 612 and 613 are controlled by the control signal CHRON which is controlled by the control circuit 160.

The first input node N1 is connected to the input terminal IN1 of the output circuit 140 via an amplifier circuit AMP1, and the second input node N2 is connected to the input terminal IN2 of the output circuit 140 via an amplifier circuit AMP2. The amplifier circuits AMP1 and AMP2 are not essential components, and the input nodes N1 and N2 may be directly connected to the input terminals IN1 and IN2, respectively.

An optical signal is transmitted to the first input node N1 from each of the optical signal holding portions $41_0L$ to $41_nL$ through the first signal line CHLS via the switch 610. Alternatively, an optical signal is transmitted to the first input node N1 from each of the optical signal holding portions $41_0R$ to $41_nR$ through the second signal line CHRS via the switch 612. A noise signal is transmitted to the second input node N2 from each of the noise signal holding portions $51_0L$ to $51_nL$ through the first signal line CHLN via the switch 611. Alternatively, a noise signal is transmitted to the second input node N2 from each of the noise signal holding portions $51_0R$ to $51_nR$ through the second signal line CHRN via the switch 613.

The amplifier circuit AMP1 includes the differential amplifier 640, the capacitive element (feedback capacitor) 620, and the reset switch 630. The amplifier circuit AMP1 amplifies the signal of the first input node N1 by an amplification factor in accordance with the ratio between the capacitance value of the capacitive element 620 and the capacitance value of the first signal line CHLS or the second signal line CHRS and supplies the amplified signal to the input terminal IN1 of the output circuit 140. The reset switch 630 is controlled by the control circuit 160. When the reset switch 630 changes to a conductive state, the amplifier circuit AMP1 is reset, the potential of the input node N1 is reset to the reference potential VREF1, and the potential of the input terminal IN1 is reset to the reference potential VREF1.

The amplifier circuit AMP2 includes the differential amplifier 641, the capacitive element (feedback capacitor) 621, and the reset switch 631. The amplifier circuit AMP2 amplifies the signal of the first input node N2 by an amplification factor in accordance with the ratio between the capacitance value of the capacitive element 621 and the capacitance value of the first signal line CHLN or the second signal line CHRN and supplies the amplified signal to the input terminal IN2 of the output circuit 140. The reset switch 631 is controlled by the control circuit 160. When the reset switch 631 changes to a conductive state, the amplifier circuit AMP2 is reset, the potential of the input node N2 is reset to the reference potential VREF1, and the potential of the input terminal IN2 is reset to the reference potential VREF1.

The reset circuit 500 performs a reset operation in which the potential of the input nodes N1 and N2 is reset to the reference potential VREF1. More specifically, the reset circuit 500 includes switches 614 and 615 and performs the reset operation of resetting the potential of the input nodes N1 and N2 to the reference potential VREF1 when the control signal CHRES is set at high level. The control signal CHRES is controlled by the control circuit 160. The amplifier circuits AMP1 and AMP2 can be reset by changing the reset switches 630 and 631 to the conductive state in a state in which the potential of the input nodes N1 and N2 has been reset to the reference potential VREF1 by the reset circuit 500.

When the reset circuit 500 performs a reset operation in a state in which the first signal lines CHLS and CHLN are connected to the input nodes N1 and N2, respectively, the potential of the first signal lines CHLS and CHLN is reset to the reference potential VREF1. When the reset circuit 500 performs a reset operation in a state in which the second signal lines CHRS and CHRN are connected to the input nodes N1 and N2, respectively, the potential of the second signal lines CHRS and CHRN is reset to the reference potential VREF1. The reset circuit 500 can also perform a reset operation in a state in which the first signal line CHLS and the second signal line CHRS are connected to the input node N1 and the first signal line CHLN and the second signal line CHRN are connected to the input node N2. In this case, the potential of the first signal lines CHLS and CHLN and the potential of the second signal lines CHRS and CHRN are simultaneously reset to the reference potential VREF1.

When the control signal AmpON which is controlled by the control circuit 160 is at high level, the output circuit (amplifier) 140 changes to the active state and outputs a pixel signal corresponding to each signal supplied to the input nodes N1 and N2 from the pixel array PA via the selection circuit SC. In this example, signals (the optical signal (S signal) and the noise signal (N signal)) supplied to the input nodes N1 and N2 are supplied to the input terminals IN1 and IN2 of the output circuit 140 via the amplifier circuits AMP1 and AMP2. The output circuit 140 outputs a pixel signal (VOUT) corresponding to the difference between the optical signal (S signal) and the noise signal (N signal) to the pad 250. When the control signal AmpON which is controlled by the control circuit 160 is at low level, the output circuit 140 changes to the inactive state. In the inactive state, the output of the output circuit 140 can be fixed to a predetermined level or be set to a floating state. When the output circuit 140 is in the active state, the power consumption of the output circuit 140 is higher than that when the output circuit 140 is in the inactive state.

Note that although a pixel signal corresponding to the difference between the optical signal and the noise signal generated by a pixel is output from the output circuit 140 in this example, an arrangement in which the output circuit 140 outputs a pixel signal corresponding not to the difference between the aforementioned signals but to the optical signal may be adopted.

Figure 3B:
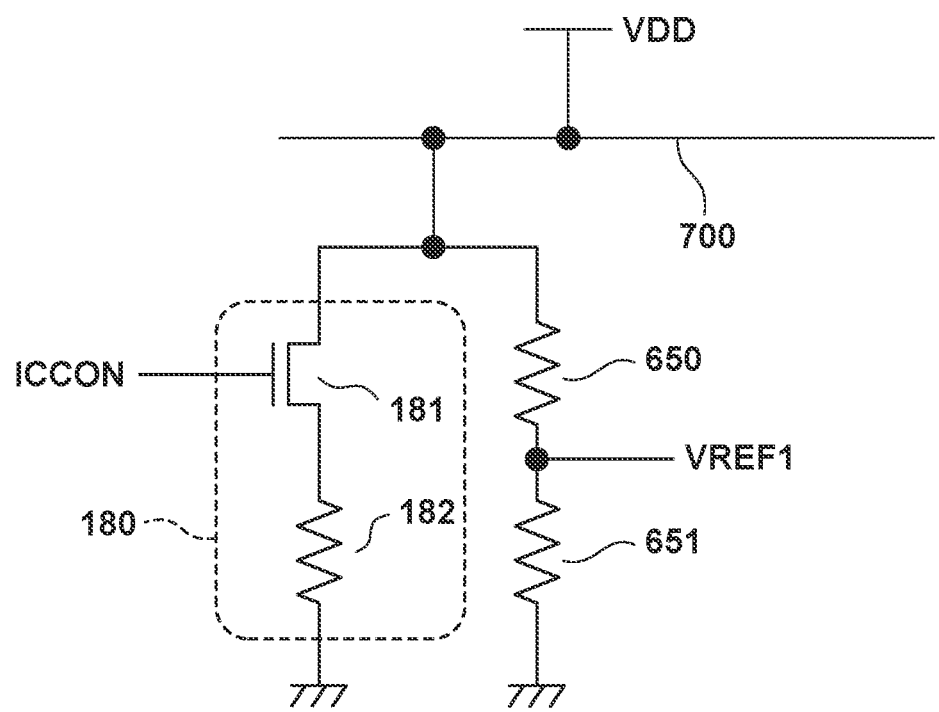

The load circuit 180 can be arranged, for example, as shown in FIG. 3B, by connecting the power supply line 700, to which the power supply voltage VDD is supplied, and a ground line (ground voltage) by a switch 181 and a load element (resistive element) 182 by series connection. The load circuit 180 consumes the first power in the first state (first period) and consumes the second power which is smaller than the first power in the second state (second period). In the first period, when the control signal ICCON which is controlled by the control circuit 160 is set at high level and the switch 181 is changed to the active state, the load circuit 180 changes to a state in which the first power is consumed when a current flows through the load element 182. In the second period, when the control signal ICCON which is controlled by the control circuit 160 is at low level and the switch 181 is changed to the inactive state, the load circuit 180 is set to a state in which the second power, which is smaller than the first power, is consumed by cutting off the current flowing through the load element 182.

The total amount of the current that flows through the power supply line 700 can easily vary immediately after the transition from the first period (in which the load circuit 180 consumes the first power and the output circuit 140 is set to the inactive state) to the second period (in which the load circuit 180 consumes the second power smaller than the first power and the output circuit 140 is set to the active state). Hence, the power supply voltage VDD can vary, and the reference potential VREF1 can also vary in accordance with this variation. Unless a measure is taken in consideration of such a variation in the reference potential VREF1, a step (offset) can be generated between the signal of a pixel of the first pixel group and the signal of a pixel of the second group.

In order to suppress a decrease in the S/N ratio, this embodiment adopts an arrangement in which the common signal line, to which each signal from the plurality of pixels of the corresponding pixel array PA is supplied, is divided into a plurality of signal lines that include the first signal lines CHLS and CHLN and the second signal lines CHRS and CHRN. This embodiment is also designed to reduce, in such an arrangement, a step (offset) generated in the transition from the first period to the second period.

Figure 4:
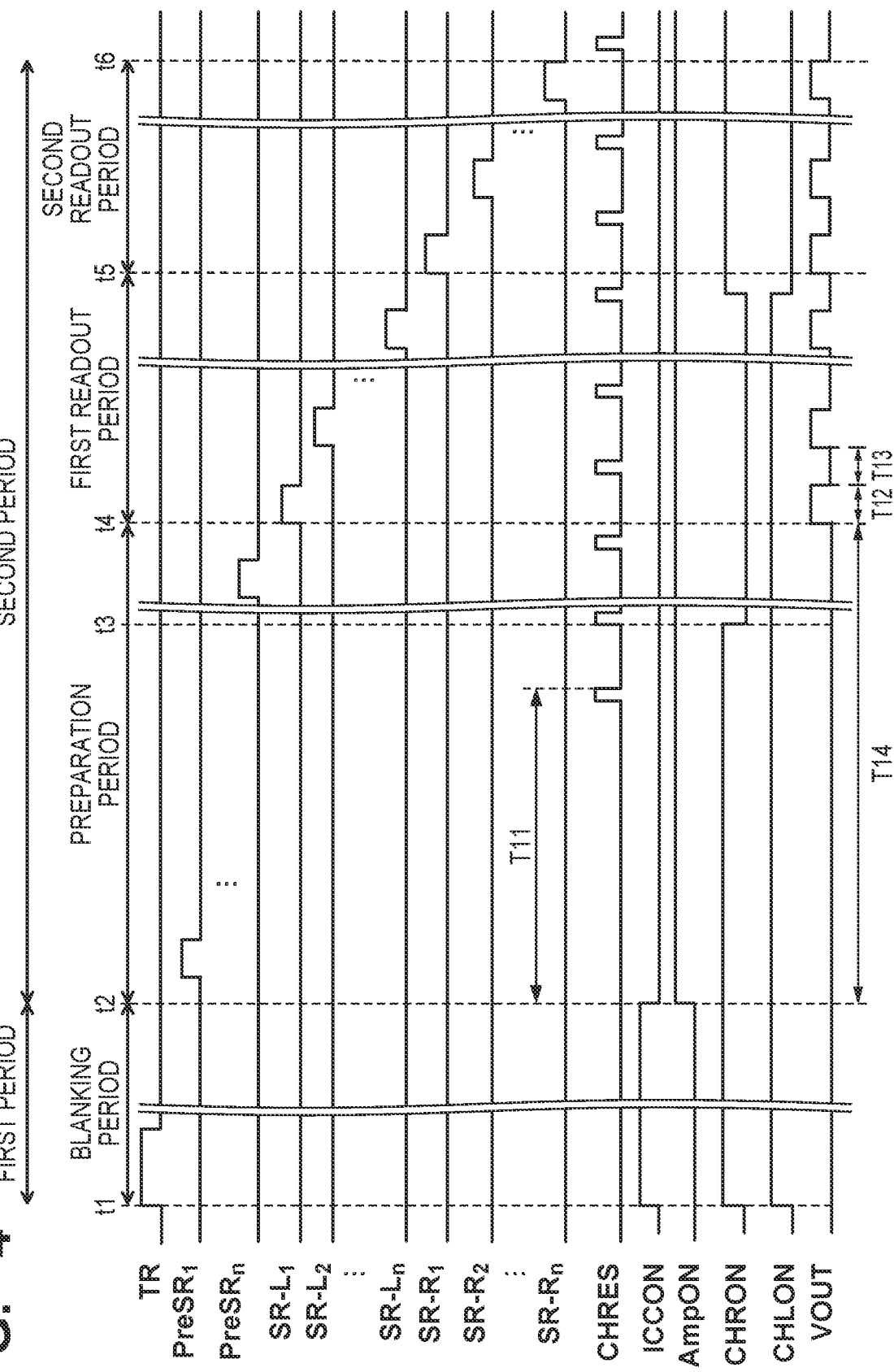
FIG. 4 is a timing chart showing an operation according to the first embodiment of the present invention.

FIG. 4 shows the operation of an image capturing device ISD according to the first embodiment. An operation period of the image capturing device ISD includes a first period and a second period. The first period includes at least a part of a photoelectric conversion period of a plurality of pixels in a first pixel group and a plurality of pixels in a second pixel group, and is a period in which an output circuit 140 does not output a pixel signal. The first period is a period from time t1 to time t2 and can be understood as a blanking period. At time t1, a trigger signal TR is driven to high level by an external apparatus. As a result, a control circuit 160 of a chip 100 supplies a control signal to each of a plurality of pixels $1_0$-1 to $1_m$-1 and causes each pixel to perform a preparation operation to output an optical signal (S signal) and a noise signal (N signal).

The control circuit 160 drives control signals CHLON, CHRON, and ICCON to high level. In response to the control signal CHLON being set at high level, switches 610 and 611 are set to a conductive state, and first signal lines CHLS and CHLN are connected to input nodes N1 and N2, respectively. In response to the control signal CHRON being set at high level, switches 612 and 613 are set to a conductive state, and second signal lines CHRS and CHRN are connected to the input nodes N1 and N2, respectively. In response to the control signal ICCON being set at high level, a load circuit 180 is changed to a first state in which it consumes the first power. Subsequently, the trigger signal TR is driven to low level by the external apparatus. In response to a control signal SEL being set at high level, the control circuit 160 supplies a signal at high level to each of shift registers $13_0$ to $13_n$.

At time t2, the control circuit 160 drives the control signal ICCON to low level and a control signal AmpON to high level. In response to the control signal ICCON being set at low level, the load circuit 180 is changed to a second state in which it consumes a second power which is smaller than the first power. Also, in response to the control signal AmpON being set at high level, the output circuit 140 changes to the active state.

The second period includes a preparation period, a first readout period after the preparation period, and a second readout period after the first readout period. The preparation period is a period from time t2 to time t4. The first readout period is a period from time t4 to time t5. The second readout period is a period from time t5 to time t6. The first readout period is a period in which the signals of the plurality of pixels $1_0$ to $1_m$ of the first pixel group are read out. The second readout period is a period in which the signals of the plurality of pixels $2_0$ to $2_m$ of the second pixel group are read out.

In the preparation period from time t2 to time t4, the shift registers $13_0$ to $13_n$ perform a preparation operation and can output signals PreSR1 to PreSR$_n$. In the preparation period from time t2 to time t4, the control circuit 160 drives a control signal CHRES to high level. As a result, switches 614 and 615 of a reset circuit 500 are set to the conductive state and a reset operation is performed to reset the potential of the first signal lines CHLS and CHLN and the potential of the second signal lines CHRS and CHRN to a reference potential VREF1.

Subsequently, at time t3, the control circuit 160 drives the control signal CHRON to low level. As a result, the second signal lines CHRS and CHRN are cut off from the input nodes N1 and N2 and set to the floating state. Subsequently, the potential of the second signal lines CHRS and CHRN is maintained at the level of the reference potential VREF1 reset by the reset operation. On the other hand, the control signal CHLON is maintained at high level and the reset operation is periodically executed by the control circuit periodically driving the control signal CHRES to high level. By this periodic reset operation, the potential of the first signal lines CHLS and CHLN connected to the input nodes N1 and N2 is periodically reset to the reference voltage VREF1.

After the preparation operation of the shift registers $13_0$ to $13_n$ has been completed, the operation transits to the first readout period from time t4 to time t5. In the first readout period from time t4 to time t5, the shift registers $13_0$ to $13_n$ sequentially activate selection signals SR-L$_1$ to SR-L$_n$. This causes holding portions $4_0$ to $4_m$ (optical signal holding portions $41_0$L to $41_n$L and noise signal holding portions $51_0$L to $51_n$L in FIG. 3A) corresponding to the plurality of pixels $1_0$ to $1_m$ of the first pixel group to be sequentially selected. As a result, the optical signal and the noise signal of each of the plurality of pixels $1_0$ to $1_m$ of the first pixel group are sequentially output to the first signal lines CHLS and CHLN. Since the first signal lines CHLS and CHLN are connected to the input nodes N1 and N2 via the switches 610 and 611, respectively, the optical signal and the noise signal of each of the plurality of pixels $1_0$ to $1_m$ of the first pixel group are sequentially output to the input nodes N1 and N2. The optical signal and the noise signal of each of the plurality of pixels $1_0$ to $1_m$ of the first pixel group, which are sequentially transmitted to the input nodes N1 and N2, are supplied to input terminals IN1 and IN2 of the output circuit 140 via amplifier circuits AMP1 and AMP2. The output circuit 140 sequentially outputs a pixel signal corresponding to the signals of each of the plurality of pixels $1_0$ to $1_m$ of the first pixel group. In this example, the pixel signal is a signal corresponding to the difference between the optical signal and the noise signal. The readout (output of pixel signals by the output circuit 140) of signals of each of the pixels $1_0$ to $1_m$ in the first pixel group is performed after the reset operation by the reset circuit 500. That is, after one reset operation, an operation to output a pixel signal of one pixel is performed for the plurality of pixels $1_0$ to $1_m$ of the first pixel group.

Subsequently, the control circuit 160 drives the control signal CHLON to low level and the control signal CHRON to high level. In the second readout period from time t5 to time t6, the shift registers $13_0$ to $13_n$ sequentially activate selection signals SR-R$_1$ to SR-R$_n$. This causes holding portions $5_0$ to $5_m$ (optical signal holding portions $41_0$R to $41_n$R and noise signal holding portions $510$R to $51_n$R) corresponding to the plurality of pixels $2_0$ to $2_m$ of the second pixel group to be sequentially selected. As a result, the optical signal and the noise signal of each of the plurality of pixels $2_0$ to $2_m$ of the second pixel group are sequentially output to the second signal lines CHRS and CHRN. Since the second signal lines CHRS and CHRN are connected to the input nodes N1 and N2 via the switches 612 and 613, respectively, the optical signal and the noise signal of each of the plurality of pixels $2_0$ to $2_m$ of the second pixel group are sequentially output to the input nodes N1 and N2. The optical signal and the noise signal of each of the plurality of pixels $2_0$ to $2_m$ of the second pixel group, which are sequentially transmitted to the input nodes N1 and N2, are supplied to input terminals IN1 and IN2 of the output circuit 140 via amplifier circuits AMP1 and AMP2. The output circuit 140 sequentially outputs a pixel signal corresponding to the signals of each of the plurality of pixels $2_0$ to $2_m$ of the second pixel group. In this example, the pixel signal is a signal corresponding to the difference between the optical signal and the noise signal. The readout (output of pixel signals by the output circuit 140) of signals of each of the pixels $2_0$ to $2_m$ in the second pixel group is performed after the reset operation by the reset circuit 500. That is, after one reset operation, an operation to output a pixel signal of one pixel is performed for the plurality of pixels $2_0$ to $2_m$ of the second pixel group.

As described above, according to this embodiment, after the first period, in a preparation period before the first readout period and the second readout period, the load circuit 180 is set to the second state that has lower power consumption than the first state. In the preparation period, the reset operation by the reset circuit 500 is performed in a state in which the first signal lines CHLS and CHLN are connected to the input nodes N1 and N2, respectively, and the second signal lines CHRS and CHRN are connected to the input nodes N1 and N2, respectively. Next, the first readout operation is executed by cutting off the connection of the second signal lines CHRS and CHRN to the input nodes N1 and N2 while maintaining a state in which the first signal lines CHLS and CHLN are connected to the input nodes N1 and N2, respectively. Subsequently, the second readout operation is executed by cutting off the connection of the first signal lines CHLS and CHLN to the input nodes N1 and N2 and connecting the second signal lines CHRS and CHRN to the input nodes N1 and N2, respectively.

Hence, the potential of the first signal lines CHLS and CHLN used to transmit each signal of a pixel to the input nodes N1 and N2 in the first readout operation is set to a potential (reference potential VREF1) determined by the reset operation in the preparation period. The potential of the second signal lines CHRS and CHRN used to transmit each signal of a pixel to the input nodes N1 and N2 in the second readout operation is also set to a potential (reference potential VREF1) determined by the reset operation in the preparation period.

Here, the parasitic capacitances of the first signal lines CHLS and CHLN increase in accordance with the number of selection switches $12_0$ to $12_m$ and $32_0$ to $32_m$. Also, the parasitic capacitances of the second signal lines CHRS and CHRN increase in accordance with the number of selection switches $22_0$ to $22_m$ and $42_0$ to $42_m$. Hence, in the first readout operation, the potential change of the first signal lines CHLS and CHLN caused by the optical signal and the noise signal transmitted from each pixel of the plurality of pixels $1_0$ to $1_m$ of the first pixel group is small. Therefore, the potential of the first signal lines CHLS and CHLN in the first readout period depends strongly on the reference potential VREF1 to which it is reset by the reset operation in the preparation period. Even if the reset operation is periodically performed for pixel signal readout in the first readout period, the influence of the reference potential VREF1, to which the potential of which the first signal lines CHLS and CHLN is reset by the reset operation in the preparation period, remains on the potential of the first signal lines CHLS and CHLN.

In the same manner, in the second readout operation, the potential change of the second signal lines CHRS and CHRN caused by the optical signal and the noise signal transmitted from each pixel of the plurality of pixels $2_0$ to $2_m$ of the second pixel group is small. Therefore, the potential of the second signal lines CHRS and CHRN in the second readout period depends strongly on the reference potential VREF1 to which it is reset by the reset operation in the preparation period. Even if the reset operation is periodically performed for pixel signal readout in the second readout period, the influence of the reference potential VREF1, to which the potential of the second signal lines CHRS and CHRN is reset by the reset operation in the preparation period, remains on the potential of the second signal lines CHRS and CHRN.

That is, in the preparation period, it is advantageous to have an arrangement in which the potential of the first signal lines CHLS and CHLN and the potential of the second signal lines CHRS and CHRN are reset simultaneously to the reference potential VREF1 by the reset operation. This allows the readout of the pixel signals in the first readout period, performed by using the first signal lines CHLS and CHLN, and the readout of the pixel signals in the second readout period, performed by using the second signal lines CHRS and CHRN, to be executed under the same conditions. As a result, it can effectively suppress the generation of a step (offset) between a pixel signal of the first pixel signal group and a pixel signal of the second pixel group.

For step reduction, a period T11 from a transition timing (time t2) from the first period to the second period until the completion timing of the reset operation by the reset circuit 500 in the preparation period can be set longer than a period 12 in which the output circuit 140 outputs one pixel signal. Alternatively, the period T11 from time t2 until the completion timing of the reset operation by the reset circuit 500 in the preparation period can be set longer than a period T13 from the end of one reset operation by the reset circuit 500 in the first readout period until the start of the next reset operation. Alternatively, a period T14 from time t2 until the start timing (time t4) of the first readout period can be set longer than the period T13 from the end of one reset operation by the reset circuit 500 in the first readout period until the start of the next reset operation. Alternatively, the period T14 from time t2 until the start timing (time t4) of the first readout period can be set to 200 ns or more.

Alternatively, the reset operation by the reset circuit 500 in the preparation period from time t2 can be performed after the potential of a power supply line 700 has settled. A state in which the potential has settled can be defined as, for example, a state in which a potential has converged to a range within ±1% of the potential (a power supply voltage VDD) of the power supply 700. Alternatively, the preparation period is set to be longer than a cycle (T12+T13) of the reset operation by the reset circuit 500 in the first readout period and that in the second readout period. For example, a period T15 can be set to 200 ns or more.

Figure 5:
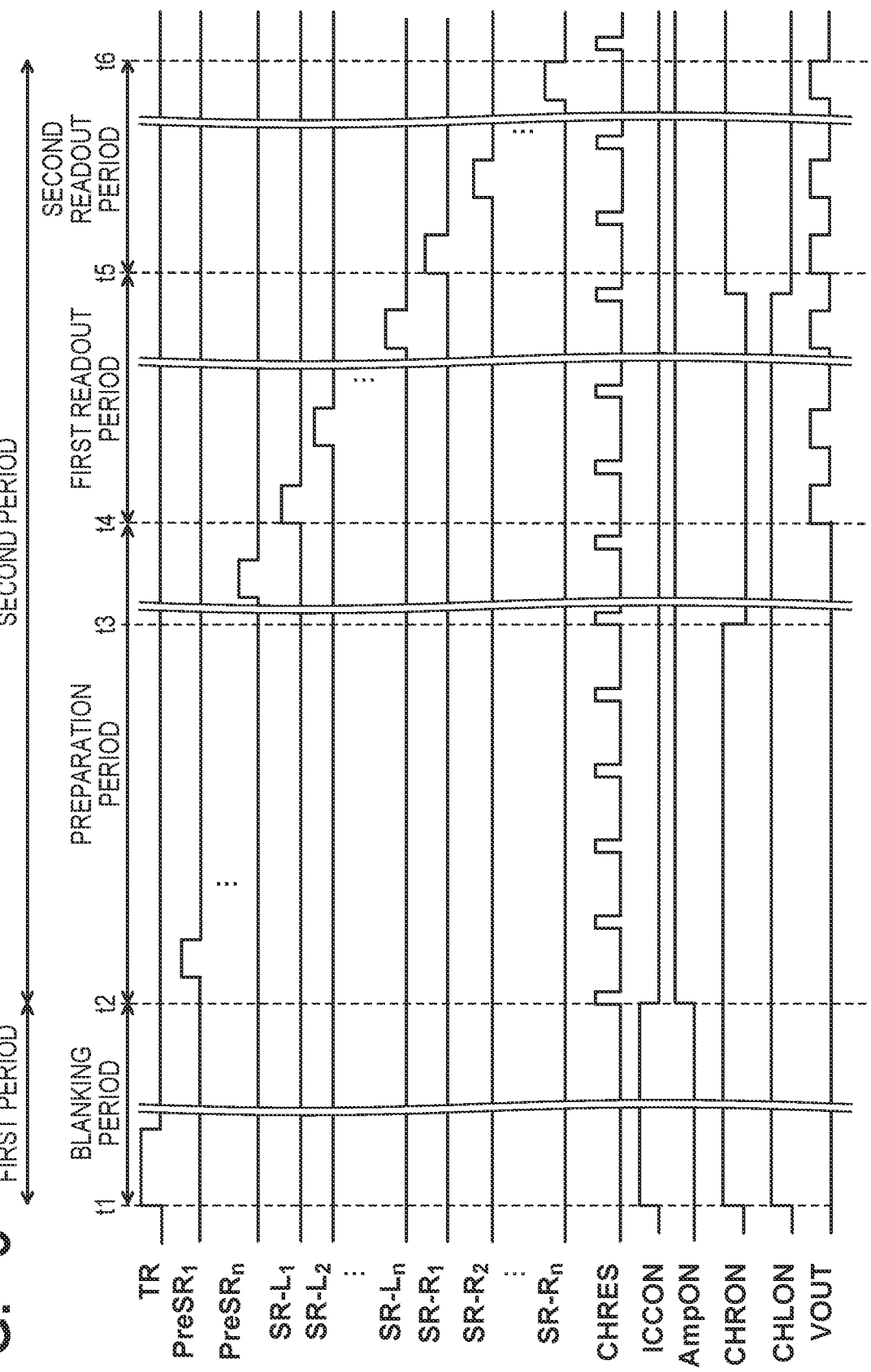
FIG. 5 is a timing chart showing an operation according to the second embodiment of the present invention.

FIG. 5 shows the operation of an image capturing device ISD according to the second embodiment. Matters not mentioned in the second embodiment can comply with the first embodiment unless they contradict each other. In the second embodiment, a reset circuit 500 performs the reset operation a plurality of times in a preparation period. This is advantageous in setting the potential (a reference potential VREF1) of first signal lines CHLS and CHLN in a first readout period and the potential (the reference potential VREF1) of the second signal lines CHRS and CHRN to be equal to each other.

The reset operation, which is to be performed a plurality of times in the preparation period, can be executed periodically. In this case, the cycle of the reset operation which is to be performed a plurality of times in the preparation period can be the same as the cycle of the reset operation by the reset circuit 500 performed in the first readout period and that performed in the second readout period.

Figure 6:
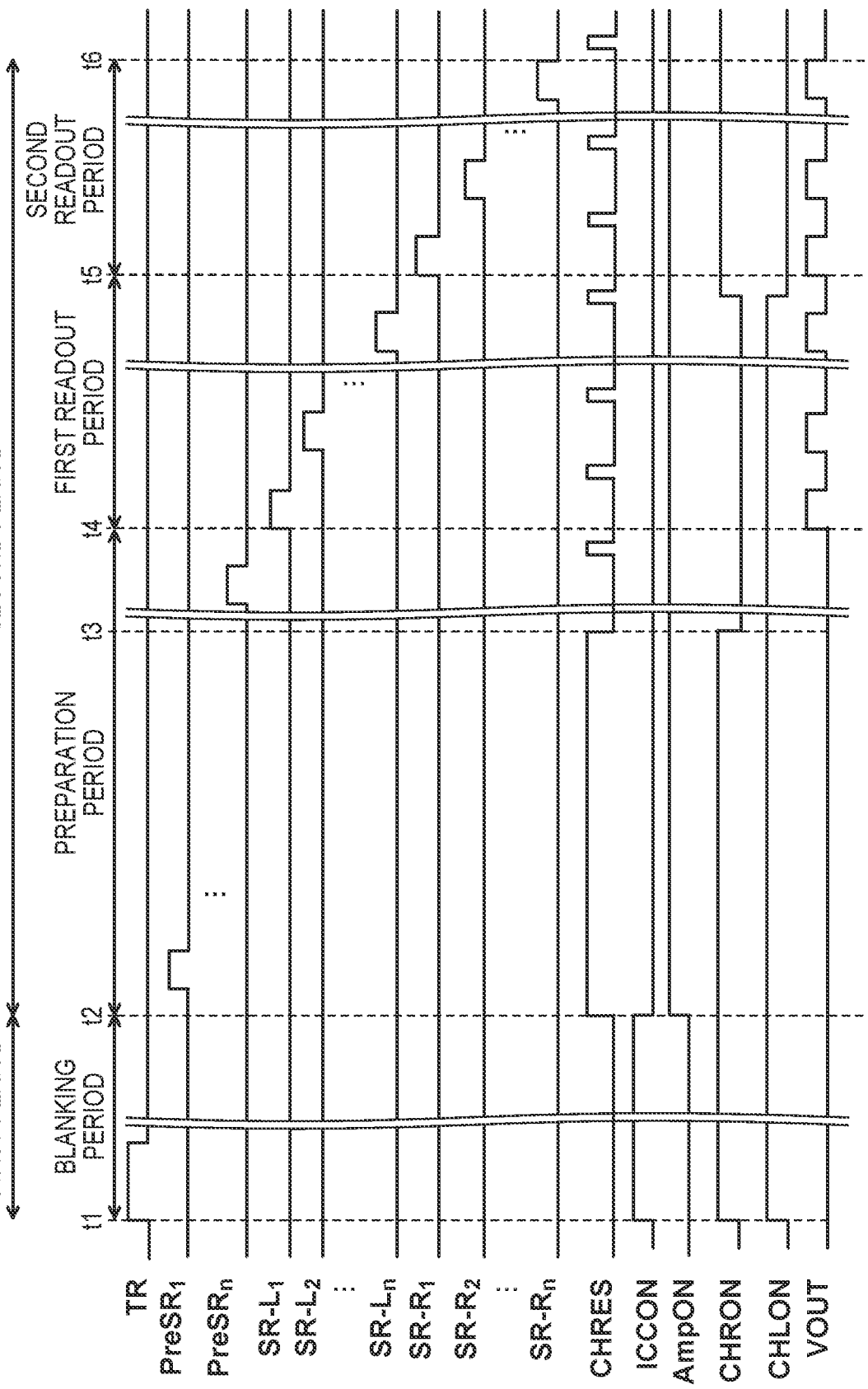
FIG. 6 is a timing chart showing an operation according to the third embodiment of the present invention.

FIG. 6 shows the operation of an image capturing device ISD according to the third embodiment. Matters not mentioned in the third embodiment can comply with the first embodiment unless they contradict each other. In the third embodiment, a reset circuit 500 continuously performs a reset operation in a preparation period. This is advantageous in setting the potential (a reference potential VREF1) of first signal lines CHLS and CHLN in a first readout period and the potential (the reference potential VREF1) of the second signal lines CHRS and CHRN to be equal to each other.

The image capturing device ISD can be used by being incorporated in an image processing apparatus. The image processing apparatus can include, for example, a processor for processing each pixel signal output from the image capturing device ISD and a recorder for recording the signal output from the processor in a medium (for example, a memory medium or a recording sheet). The image processing apparatus may include a display portion for displaying an image based on the signal output from the processor.

Alternatively, the image capturing device ISD can include a processor for processing each pixel signal output from a output circuit 140 and a recorder for recording the signal output from the processor on a medium (for example, a memory medium or a recording sheet). The image capturing device ISD may include a display portion for displaying an image based on the signal output from the processor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125591, filed Jun. 27, 2017, which is hereby incorporated by reference herein in its entirety.

What is claimed is:

1. An image capturing device comprising:
a pixel array that includes a plurality of pixels forming a first pixel group and a plurality of pixels forming a second pixel group;
a selection circuit configured to sequentially output signals of the plurality of pixels of the first pixel group to a first signal line and sequentially output signals of the plurality of pixels of the second pixel group to a second signal line;
an output circuit having an input node and configured to output a pixel signal in accordance with a signal supplied to the input node from the pixel array via the selection circuit;
a switch circuit configured to control a connection of the first signal line to the input node and a connection of the second signal line to the input node;
a load circuit configured to consume power; and
a reset circuit configured to perform a reset operation of resetting a potential of the input node,
wherein the load circuit consumes a first power in a first period in which at least a part of a photoelectric conversion period of the pixel array is included and the output circuit does not output the pixel signal, and the load circuit consumes a second power which is smaller than the first power in a second period different from the first period,
the second period includes a preparation period, a first readout period which is after the preparation period and in which a signal is read out from the first pixel group, and a second readout period which is after the first readout period and in which a signal is read out from the second pixel group,
the first signal line and the second signal line are reset, in the preparation period, by the reset circuit performing the reset operation in a state in which the first signal line and the second signal line are connected to the input node by the switch circuit,
pixel signals corresponding to the signals of the plurality of pixels of the first pixel group are sequentially output, in the first readout period, by the output circuit in a state in which the first signal line is connected to the input node and the second signal line is disconnected from the input node by the switch circuit, and
pixel signals corresponding to the signals of the plurality of pixels of the second pixel group are sequentially output, in the second readout period, by the output circuit in a state in which the first signal line is disconnected from the input node and the second signal line is connected to the input node by the switch circuit.

2. The device according to claim 1, wherein in the first readout period, the output of a pixel signal corresponding to a signal of each pixel of the first pixel group by the output circuit is performed after the first signal line is reset by the reset operation, and in the second readout period, the output of a pixel signal corresponding to a signal of each pixel of the second pixel group by the output circuit is performed after the second signal line is reset by the reset operation.

3. The device according to claim 1, wherein a period from a transition timing from the first period to the second period until a completion timing of the reset operation in the preparation period is longer than a period in which the output circuit outputs one pixel signal.

4. The device according to claim 2, wherein a period from a transition timing from the first period to the second period until a completion timing of the reset operation in the preparation period is longer than a period from the end of one reset operation until the start of the next reset operation in the first readout period.

5. The device according to claim 2, wherein in a period from a transition timing from the first period to the second period until a start timing of the first readout period is longer than a period from the end of one reset operation until the start of the next reset operation in the first readout period.

6. The device according to claim 2, wherein in the second period, the second readout period starts after the first readout period, and
a transition timing from the first period to the second period until a start timing of the first readout period is not less than 200 ns.

7. The device according to claim 1, wherein in the first readout period and the second readout period, the reset operation by the reset circuit is periodically performed, and
the preparation period is longer than a cycle of the reset operation by the reset circuit in the first readout period and a cycle of the reset operation by the reset circuit in the second readout period.

8. The device according to claim 1, wherein the reset circuit performs the reset operation a plurality of times in the preparation period.

9. The device according to claim 1, wherein the reset circuit continuously performs the reset operation in the preparation period.

10. The device according to claim 1, wherein power is supplied to the output circuit and the load circuit by a common power supply line.

11. The device according to claim 1, further comprising:
a first holding portion configured to hold the signals of the plurality of pixels of the first pixel group, and a second holding portion configured to hold the signals of the plurality of pixels of the second pixel group,
wherein the selection circuit sequentially outputs, to the first signal line, the signals of the plurality of pixels of the first pixel group held by the first holding portion, and sequentially outputs, to the second signal line, the signals of the plurality of pixels of the second pixel group held by the second holding portion.

12. The device according to claim 1, wherein the switch circuit comprises an amplifier circuit configured to amplify the potential of the input node and supply the amplified potential to the output circuit.

13. The device according to claim 1, wherein each of the first signal line and the second signal line comprises a signal line configured to transmit an optical signal from the pixel array and a signal line configured to transmit a noise signal from the pixel array,
the input node comprises a first input node to which the optical signal from the pixel array is supplied and a second input node to which the noise signal from the pixel array is supplied, and
the output circuit outputs a pixel signal which corresponds to a difference between the optical signal supplied to the first input node and the noise signal supplied to the second input node.

14. The device according to claim 1, further comprising:
a processor configured to process the pixel signal output from the output circuit; and
a recorder configured to record a signal output from the processor.

15. A driving method for driving an image capturing device,
the image capturing device comprising a pixel array that includes a plurality of pixels forming a first pixel group and a plurality of pixels forming a second pixel group, a selection circuit configured to sequentially output signals of the plurality of pixels of the first pixel group to a first signal line and sequentially output signals of the plurality of pixels of the second pixel group to a second signal line, an output circuit having an input node and configured to output a pixel signal in accordance with a signal supplied to the input node from the pixel array via the selection circuit, a switch circuit configured to control a connection of the first signal line to the input node and a connection of the second signal line to the input node, a load circuit configured to consume power, and a reset circuit configured to perform a reset operation of resetting a potential of the input node,
wherein the load circuit consumes a first power in a first period in which at least a part of a photoelectric conversion period of the pixel array is included and the output circuit does not output the pixel signal, and the load circuit consumes a second power which is smaller than the first power in a second period different from the first period, and
the second period includes a preparation period, a first readout period which is after the preparation period and in which a signal is read out from the first pixel group, and a second readout period which is after the first readout period and in which a signal is read out from the second pixel group,
the driving method comprising:
resetting, in the preparation period, the first signal line and the second signal line by the reset circuit performing the reset operation in a state in which the first signal line and the second signal line are connected to the input node by the switch circuit;
sequentially outputting, in the first readout period, pixel signals corresponding to the signals of the plurality of pixels of the first pixel group by the output circuit in a state in which the first signal line is connected to the input node and the second signal line is disconnected from the input node by the switch circuit; and
sequentially outputting, in the second readout period, pixel signals corresponding to the signals of the plurality of pixels of the second pixel group by the output circuit in a state in which the first signal line is disconnected from the input node and the second signal line is connected to the input node by the switch circuit.

* * * * *